US006321303B1

(12) United States Patent
Hoy et al.

(10) Patent No.: US 6,321,303 B1
(45) Date of Patent: Nov. 20, 2001

(54) DYNAMICALLY MODIFYING QUEUED TRANSACTIONS IN A CACHE MEMORY SYSTEM

(75) Inventors: Thomas Alan Hoy, Austin, TX (US); Belliappa Manavattira Kuttanna, Sunnyvale, CA (US); Rajesh Patel; Michael Dean Snyder, both of Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/271,492

(22) Filed: Mar. 18, 1999

(51) Int. Cl.[7] .................................................. G06F 12/08
(52) U.S. Cl. ......................... 711/140; 711/143; 711/146; 711/171; 711/123; 711/125; 711/126
(58) Field of Search ................................. 711/140, 143, 711/171, 141, 146; 714/5

(56) References Cited

U.S. PATENT DOCUMENTS

| 4,298,929 | 11/1981 | Capozzi | 364/200 |
|---|---|---|---|
| 4,680,702 | 7/1987 | McCarthy | 364/200 |
| 4,916,604 | 4/1990 | Yamamoto et al. | 364/200 |
| 5,155,843 | * 10/1992 | Stamm et al. | 714/5 |
| 5,317,720 | * 5/1994 | Stamm et al. | 711/143 |
| 5,333,296 | * 7/1994 | Bouchard et al. | 711/171 |
| 5,367,660 | 11/1994 | Gat et al. | 395/425 |
| 5,630,075 | 5/1997 | Joshi et al. | 395/250 |
| 5,745,729 | 4/1998 | Greenley et al. | 395/458 |
| 5,751,996 | 5/1998 | Glew et al. | 711/145 |
| 5,809,530 | * 9/1998 | Samra et al. | 711/140 |

* cited by examiner

Primary Examiner—Matthew Kim
Assistant Examiner—B. Peugh
(74) Attorney, Agent, or Firm—Joseph P. Lally; Anthony V. England

(57) ABSTRACT

A computer and its corresponding cache system includes a cache memory, a buffer unit, and a bus transaction queue. The buffer unit includes a plurality of entries suitable for temporarily storing data, address, and attribute information of operations generated by the CPU. A first operation initiated by the load store unit buffers an operation in a first entry of the buffer unit, which initiates a first transaction to be queued in a first entry of the bus transaction queue where the first transaction in the bus transaction queue points to the first entry in the buffer unit. Preferably, the buffer unit is configured to modify the first transaction from a first transaction type to a second transaction type prior to execution in response to an event that alters the data requirements of the queued transaction. Additional utility is achieved by merging multiple store operation that miss to a common cache line into a single entry. Further benefits is achieved by allowing multiple load misses to the same cache line to be completed from a buffer that reduces cache pipeline stalls.

20 Claims, 8 Drawing Sheets

|Entry Number|Entry Valid|Store|...|Hit Shared|...|Needs Data|
|---|---|---|---|---|---|---|
|0| | |...| |...| |
|1| | | | | | |
|2| | | | | | |
|3|1|1| |0| |1|
|4| | | | | | |
|5|1|1| |1| |0|
|6| | | | | | |
|7| | | | | | |

FIG.4 — RELOAD UNIT 12

| Miss Queue Entry Number | Miss Queue Entry Valid | ... | Bus Transaction Type 82 | ... | Reload Unit Entry Number |
|---|---|---|---|---|---|
| 0 | 1 | ... | RWITM | ... | 3 |
| 1 | 1 | | KILL | | 5 |
| 2 | | | | | |

FIG.5 — BUS MISS QUEUE 16

DYNAMICALLY MODIFYING QUEUED TRANSACTIONS IN A CACHE MEMORY SYSTEM

RELATED APPLICATIONS

The present invention is related to the subject matter of the following U.S. Patent applications: Kuttana et al., Multiple Store Miss Handling in a Cache Memory System, Application Ser. No. 09/271,494, and Kuttanna et al., Multiple Load Miss Handling in a Cache Memory System, Application Ser. No. 09/271,493, both filed on the filing date of this application.

FIELD OF THE INVENTION

The present invention relates generally to data processing systems, and specifically to memory control of a data cache.

BACKGROUND OF THE INVENTION

A known way to increase the performance of a computer system is to include a local high speed memory known as a cache. A cache increases system performance in part because there is a high probability that once the central processing unit (CPU) accesses data at a particular address it will soon access an adjacent address. A well designed cache typically fetches and stores a quantity of data, commonly referred to as a line, that includes data from a desired memory address as well as data from addresses in the vicinity of the desired address from slower main memory or from a lower level cache. In very high performance computer systems, several caches may be placed in a hierarchy. The cache which is closest to the CPU, known as the upper level or L1 cache, is the highest level cache in the hierarchy and is generally the fastest. Other generally slower caches are then placed in descending order in the hierarchy, starting with the L2 cache, etc., until the lowest level cache which is connected to main memory. Note that typically, the L1 cache is located on the same integrated circuit as the CPU whereas the L2 cache may be located off chip.

Recently, microprocessors designed for desktop applications such as personal computers (PCs) have been modified to increase processing efficiency for multi-media applications. For example, a video program may be stored in a compression format known as the motion picture experts group (MPEG-2) format. When processing the MPEG-2 data, the microprocessor must create frames of decompressed data quickly enough for display on the computer screen in real time. However, when processing MPEG-2 data, the data set may be large enough to cause high cache miss rates, resulting in a fetch latency that can be as long as 100 to 150 processor clock cycles.

Even with aggressive out-of-order processor microarchitectures, it is difficult for the processor to make forward progress in program execution when waiting for data from long latency memories when cache miss rates are significant. Moreover, for data processing systems that require coherent data sharing between a processor and another peripheral device such as a graphics card or in processing systems requiring coherent data sharing between multiple processors, it is even more difficult for the processing system to make forward progress in program execution when waiting for data from long latency memories when cache miss rates are significant. Accordingly, a need exists for processors and processing systems which allow for efficient use of memory subsystem resources and prevent memory stalls on cache misses.

SUMMARY OF THE INVENTION

The problems identified above are addressed by a cache memory system according to the present invention in which transactions that are initiated and placed in a transaction queue in response to load/store operations generated by a CPU are modified while pending in the queue in recognition of additional load/store operations that alter the data requirements of the originally issued transaction. Additional utility is achieved in one embodiment of the invention by merging multiple store operations that miss to a common cache line into a single entry. In another embodiment, a similar benefit is achieved through a mechanism and method by which multiple load operations that miss to a common cache line are satisfied or completed from a buffer thereby effectively reducing cache pipeline stalls.

Broadly speaking, a first application of the present invention contemplates a computer and its corresponding cache system that includes a cache memory, a buffer unit, and a transaction queue. The cache memory is coupled to a load/store unit of a CPU. The buffer unit is coupled to the cache memory and includes a plurality of entries suitable for temporarily storing data, address, and attribute information of operations generated by the CPU. The bus transaction queue is coupled to the buffer unit and includes a plurality of entries. Each transaction queue entry includes a pointer to one of the plurality of buffer unit entries. A first operation initiated by the load/store unit buffers an operation in a first entry of the buffer unit, which in turn initiates a first transaction to be queued in a first entry of the bus transaction queue where the first transaction in the bus transaction queue points to the first entry of the buffer unit. Preferably, the buffer unit is configured to modify the first transaction from a first transaction type to a second transaction type prior to execution in response to a event occurring after the queuing of the first transaction.

In one embodiment, the first transaction type requires data from a system memory or from a lower order cache memory while the second transaction type requires no data. The required data for the first transaction type may be provided via a system bus to which the cache system is connected. In one embodiment, the first operation comprises a store operation that misses in the cache memory and the first transaction is a read with intent to modify (RWIM) transaction. The event that results in the modification of the transaction type may comprise additional store miss operations occurring after the first operation but prior to execution of the first transaction, wherein the additional store miss operations and the first operation map to a common cache line (ie., the operations share a common cache line address)

In another embodiment, the first transaction type requires no data and the second transaction type requires data. In this embodiment, the first operation may include a store operation that hits in the cache memory to a shared cache line and the first transaction may comprise a KILL transaction that invalidates all other cached copies of the cache line. An event that might suitably initiate modification of the first transaction in this embodiment includes a snooped transaction on the system bus detected by a snoop control unit coupled between the buffer unit and the system bus where the cache line address of the snooped transaction is the same as the cache line address of the shared cache line.

In one embodiment, each buffer unit entry includes a transaction type field that indicates whether the corresponding transaction requires data. In a presently preferred embodiment, a single bit transaction type field is sufficient to differentiate between transactions requiring data and transactions not requiring data.

The first application of the invention further contemplates a method of handling operations in a cache system. Initially, in response to a CPU issuing a first operation that is unable to complete in a cache memory, a first operation is stored in an entry of the buffer unit and queued in a first entry of a bus transaction queue which points to the buffer unit entry. Thereafter, the transaction type of the first transaction is modified in response to an event occurring prior to execution of the first transaction where the transaction type indicates whether the first transaction requires data.

In one embodiment, the first transaction type requires data prior to the modification and requires no data after the modification. In this embodiment, the first operation may suitably comprise a store operation that misses in the cache memory and the event responsible for the modification of the transaction type may comprise at least one subsequent store operation where the first and subsequent store operations share a common cache line address. In one embodiment, the first and subsequent store operations may be merged into a single buffer unit entry and the modification of the first transaction occurs if the first and subsequent store operations affect each byte of the buffer unit entry's data buffer. In this embodiment, the first transaction type may suitably comprise a RWITM transaction prior to modification and a KILL transaction after modification.

In another embodiment, the first transaction type requires no data prior to the modification and requires data after the modification. In this embodiment the first transaction may suitably comprise a KILL transaction prior to modification and a RWITM transaction after modification and the first operation may comprise a store operation that hits to a shared cache line in the cache memory. In this embodiment, the event that results in the modification of the first transaction may comprise a snooped transaction appearing on the system bus, where a cache line address of the snooped transaction is the same as the cache line address of the shared cache line.

The method may further comprise, in response to the CPU issuing a second operation that is unable to complete in the cache memory, storing the second operation in a second entry of the buffer unit and queuing a second transaction in a second entry of the bus transaction queue. Thereafter, the transaction type of said second transaction is altered to the first transaction type in response to a subsequent event occurring prior to execution of the second transaction.

A second application of the present invention contemplates efficient handling of store operations in which multiple store misses to a common cache line occurring proximally in time to one another are merged into a single entry in a buffer such that a single cache reload is executed when the remainder of the cache line has been fetched from memory.

Broadly speaking the second application of the invention comprises a cache memory suitable for coupling to a load/store unit of a CPU, a buffer unit comprised of a plurality of entries each including a data buffer and a corresponding address tag. The system is configured to initiate a data fetch transaction in response to a first store operation that misses in both the cache memory and the buffer unit, to allocate a first entry in the buffer unit, and to write the first store operation's data in the first entry's data buffer. The system is adapted to write data from at least one subsequent store operation into the first entry's data buffer if the subsequent store operation misses in the cache but hits in the first entry of the buffer unit prior to completion of the data fetch transaction. In this manner the first entry's data buffer includes a composite of the first and subsequent store operations' data.

Preferably, the cache system is further configured to merge, upon completion of the data fetch, the fetched data with the store operation data in the first entry's data buffer and to reload the cache memory from the first entry's data buffer. The merging of the fetch data and the store operation data preferably includes filling in portions of the data buffer unaffected by the first or subsequent store operations with corresponding portions of the fetched data and ignoring portions of the fetched data that have been overwritten by the store operations. In the preferred embodiment, each buffer unit entry further includes data valid bits that indicate the validity of corresponding portions of the entry's data buffer. In this embodiment, the buffer unit is 15 preferably configured to reload the cache memory from the first buffer unit entry if all of the first entry's data valid bits are set prior to completion of the data fetch transaction thereby affecting a "silent" reload of the cache memory in which no data is ultimately required from memory. The buffer unit may suitably be designed to modify the pending data fetch transaction from a transaction requiring data to a transaction not requiring data if all of the first entry's data valid bits are set prior to completion of the data fetch transaction thereby conserving valuable system bus bandwidth. In one embodiment, each buffer unit entry data buffer has 32 bytes and 32 corresponding data valid bits.

The second application of the invention further contemplates a method of handling cache operations. A data fetch transaction is initiated and a first entry in a buffer unit allocated in response to a first store operation that misses in both a cache memory and the buffer unit. The first store operation's data is written into a data buffer of the first entry. Thereafter, data from at least one subsequent store operation is written into the first entry's data buffer if the subsequent store operation misses in the cache memory but hits in the first entry of the buffer unit prior to completion of the data fetch transaction. In one embodiment, allocating the first buffer unit entry includes clearing all of the first entry's data valid bits. Preferably, the data valid bits of the first entry are updated each time store operation data is written to the first entry's data buffer. In one embodiment, the data fetch transaction is altered from a transaction requiring data to a transaction not requiring data if all portions of the first entry's data buffer have been written prior to completion of the data fetch transaction. In one embodiment, the method further includes initiating a second data fetch transaction and allocating a second entry in the buffer unit in response to a second store operation that misses in both the cache memory and the buffer unit and writing the second store operation's data into the second entry's data buffer and writing data from at least one subsequent store operation into the second entry's data buffer if the subsequent store operation misses in the cache memory but hits in the second entry of the buffer unit prior to completion of the second data fetch transaction.

A third application of the present invention contemplates an improved apparatus and method for processing multiple load misses to a common cache address. Broadly speaking, the third application of the invention includes a cache memory configured for coupling to a load/store unit of a CPU, a buffer unit coupled to said cache memory, and an operation queue comprising a plurality of entries, wherein each valid operation queue entry points to an entry in the buffer unit. The buffer unit includes a plurality of data buffers and each of the data buffers is associated with a corresponding address tag. The system is configured to initiate a data fetch transaction and allocate an entry in the buffer unit in response to a CPU load operation that misses in both the cache memory and the buffer unit. The cache system is further configured to allocate entries in the operation queue in response to subsequent CPU load operations that miss in the cache memory but hit in the buffer unit prior to completion of the data fetch.

Preferably, the system is configured to store the fetched data in the buffer unit entry upon satisfaction of said data fetch and still further configured to satisfy pending load operations in the operation queue from the buffer unit entry. In the preferred embodiment, the system is configured to reload the cache memory from the buffer unit entry upon satisfying all operation queue entries pointing to the buffer unit entry and, thereafter, to invalidate the buffer unit entry and the operation queue entries. The buffer unit entries preferably each include data valid bits indicative of which portions of data stored in a buffer unit entry are valid.

The third application of the invention still further contemplates a method of managing a cache memory system in which a data fetch is initiated and an first entry allocated in a buffer unit in response to a first CPU load operation that misses in both the cache memory and the buffer unit. Thereafter, entries are allocated in an operation queue in response to at least one subsequent load operation that misses in the cache memory but hits in the first buffer unit entry prior to completion of the data fetch. Upon completion of the data fetch, the fetched data is loaded in the first buffer unit entry and the subsequent load operations are completed from the buffer unit entry thereby reducing activity on the cache pipeline. Preferably, upon satisfying the subsequent load operations, the cache memory is reloaded from the buffer unit entry and the buffer unit entry and operation queue entries are invalidated. In one embodiment the method includes updating the first entry's data valid bits upon completion of the data fetch to indicate which portions of the first buffer unit entry are valid. In this embodiment, the data valid bits are compared with the portions of the buffer unit entry required to complete the operations pending in the operation queue. Completion of operations pending in the operation queue from the buffer unit entry is suspended if the required portions of the data buffer are not valid. In one embodiment, the reloading of the cache memory from the buffer unit entry and the satisfying of the subsequent load operations from the buffer unit entry proceed concurrently to improve system performance. In another performance improving embodiment, the CPU issues additional load/ store operations to the cache memory while the subsequent operations are being completed from the buffer unit entry.

BRIEF DESCRIPTION OF THE DRAWINGS

Other objects and advantages of the invention will become apparent upon reading the following detailed description and upon reference to the accompanying drawings in which:

FIGS. 2 and 4 illustrate, in block diagram form, a buffer unit identified as the reload unit in the computer system of FIG. 1, according to one embodiment of the present invention;

FIGS. 3 and 5 illustrate, in block diagram form, a transaction queue identified as the bus miss queue in the computer system of FIG. 1, according to one embodiment of the present invention;

Figure 1:
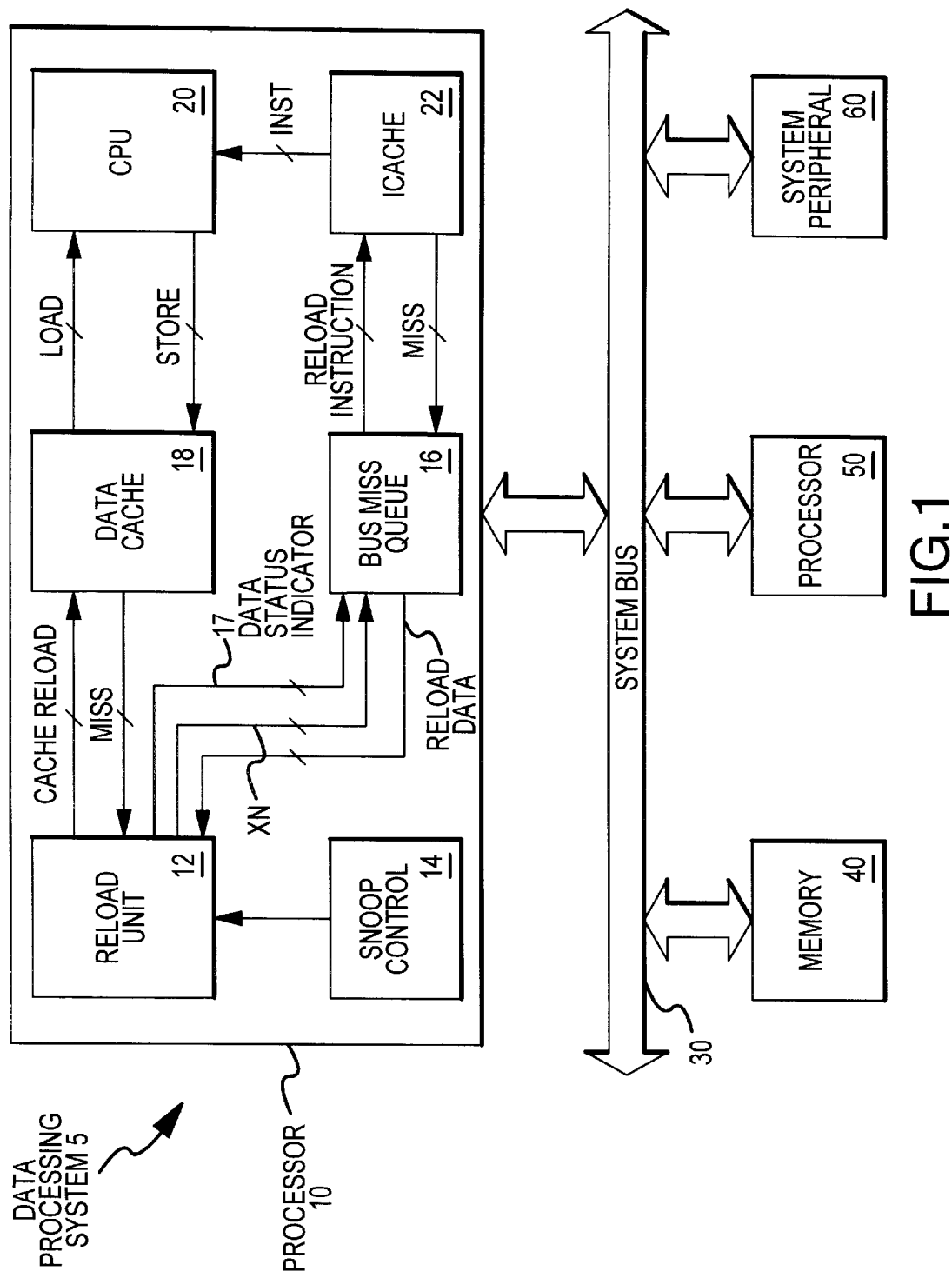
FIG. 1 illustrates, in block diagram form, a computer system according to one embodiment of the present invention.

While the invention is susceptible to various modifications and alternative forms, specific embodiments thereof are shown by way of example in the drawings and will herein be described in detail. It should be understood, however, that the drawings and detailed description presented herein are not intended to limit the invention to the particular embodiment disclosed, but on the contrary, the intention is to cover all modifications, equivalents, and alternatives falling within the spirit and scope of the present invention as defined by the appended claims.

DESCRIPTION OF A PREFERRED EMBODIMENT

FIG. 1 illustrates a portion of a computer system 5 in accordance with one embodiment of the present invention. Computer system 5 comprises a processor 10, a system bus 30, system memory 40, a second processor 50 and system peripheral 60. In one embodiment of the invention, processor 10 comprises a buffer unit identified throughout this disclosure as reload unit 12, snoop control 14, a transaction queue identified throughout this disclosure as bus miss queue 16, data cache (CACHE) 18, CPU (CPU) 20 and instruction cache (ICACHE) 22. CPU 20 executes instructions, where instructions are received from ICACHE 22 and data is loaded from data cache 18. Similarly, CPU 20 stores data in data cache 18.

As illustrated in FIG. 1, CPU 20 is coupled to data cache 18, receives data from data cache 18, and stores data to data cache 18. Data cache 18 is coupled to reload unit 12 and sends a miss signal preferably including address, attribute, and, in the case of a store operation, data information to reload unit 12 when a requested load operation issued by CPU 20 misses or is not valid in data cache 18 or when a CPU store operation misses or hits to an invalid or shared cache line in data cache 18. A cache line is in the shared state when more than one processor or system resource maintains a copy of the line in its respective cache. In this case, prior to a modification of data cache 18 a system bus transaction (referred to for purposes of this disclosure as a KILL transaction) is performed to invalidate all other shared copies of that address.

Reload unit 12 sends a cache reload signal to data cache 18 to signal data cache 18 when all bytes in a reload unit entry contain valid data Reload unit 12 is also coupled to snoop control 14 and receives address and transaction code information from snoop control 14 when snoop control 14 detects a snooped transaction (i.e., a data modifying transaction on system bus 30 with an address that is valid in data cache 18 or reload unit 12). A transaction queue identified as bus miss queue 16 is coupled to reload unit 12 and receives data status indicator 17 from reload unit 12. Data status indicator 17 provides information regarding the data requirements of a given transaction. The data requirements of a transaction refer to whether reload unit 12 will require data from memory 40 (or from a lower level cache memory not depicted in the drawing) to execute a reload to data cache 18. Data status indicator 17 beneficially provides a mechanism by which a pending transaction may be dynamically altered in response to cache activity occurring after the pending transaction was generated but before the pending transaction is executed. For example, store operations that miss in data cache 18 but hit to reload unit 12 that occur after reload unit 12 queues a transaction in bus miss queue 16 may negate the need for data from memory 40 if the store operations ultimately overwrite the entire data buffer in reload unit entry 12. In that case, the pending transaction may be dynamically altered from a transaction requiring address and data information (i.e., requiring multiple cycles of system bus 30) to a transaction requiring only address information.

Bus miss queue 16 receives a transaction signal (XN) from reload unit 12 and reload unit 12 receives reload data information from bus miss queue 16. Bus miss queue 16 is also coupled to ICACHE 22. Bus miss queue 16 receives a miss signal from ICACHE 22 when a required instruction is not available in ICACHE 22. Bus miss queue 16 sends reload instruction information to ICACHE 22 to provide the required instruction after performing a transaction on system bus 30. Note that processor 10 is bi-directionally coupled to system bus 30, and is able to communicate with other resources via system bus 30.

According to one embodiment, data processing system 5 includes multiple resources, where processor 50 is similar to processor 10, having a data cache, an instruction cache and a CPU. In alternate embodiments, processor 50 may be another type of processor without cache memory. System peripheral 60 may be any other device which performs transactions on system bus 30. In addition, it should be appreciated that system peripheral 60 may be any device that can obtain exclusive ownership of a cache line. For example, system peripheral 60 may be a graphics card, a level 2 cache, a bridge to an external bus, or the like. As shown in FIG. 1, processor 10, memory 40, processor 50 and system peripheral 60 are bi-directionally coupled to system bus 30.

Figure 2:
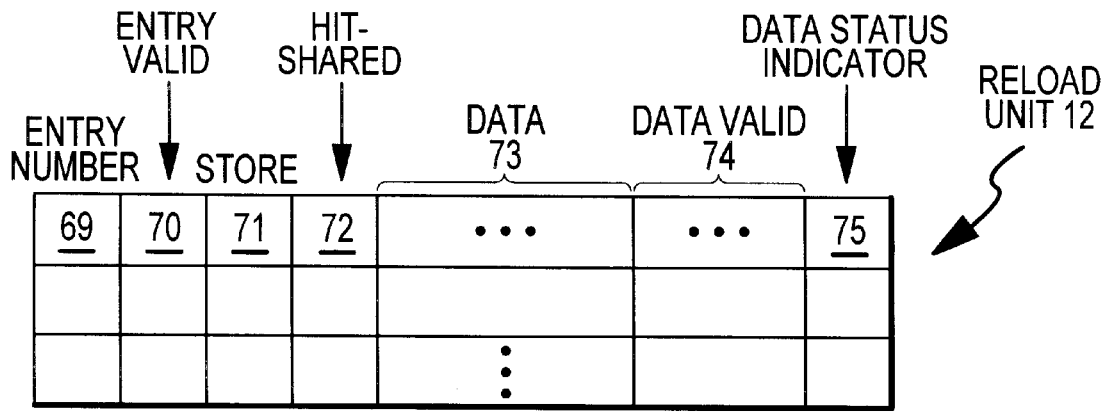

Shown in FIG. 2 is a buffer unit or reload unit 12 in accordance with one embodiment of the present invention. Each entry in reload unit 12 includes a reload unit entry number field 69, a reload unit entry valid bit 70, a store bit 71, a hit shared bit 72, a data buffer 73 comprised of a field of data bits, data valid bits 74, and a data status indicator bit 75. Reload unit entry number field 69 indicates a position within reload unit 12. Reload unit entry valid bit 70 indicates if the associated entry is valid while store bit 71 differentiates between store and load operations for that entry. Hit shared state bit 72 is used indicate a store has hit to a shared line in data cache 18. Data buffer 73 is suitable for storing data for a load/store operation and is preferably sized to accommodate a cache line. Data valid bits 74 are used to indicate whether or not the data in corresponding portions of data buffer 73 are valid. In one embodiment, for example, data buffer 73 includes 32 bytes of data and data valid bits 74 includes 32 bits, each corresponding to a byte of data of data buffer 73. Data status indicator bit 75 is used is used in conjunction with data status indicator 17 to indicate whether reload unit 12 requires data from system bus 30 for that entry.

Figure 3:
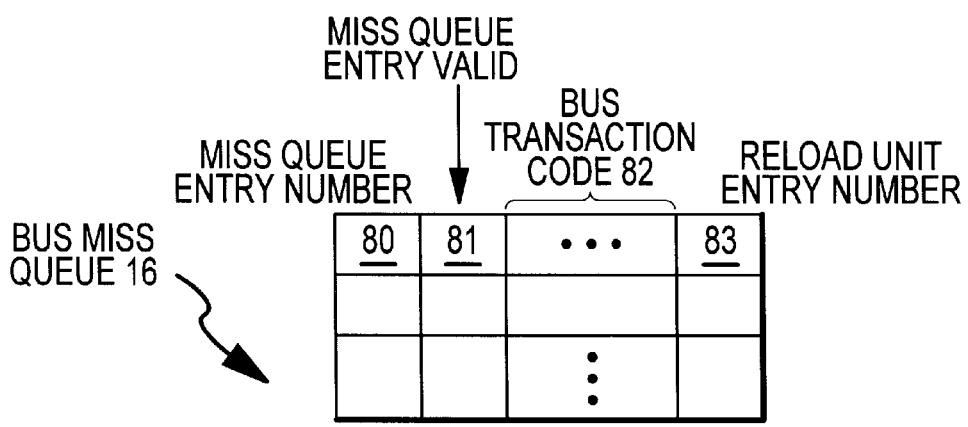

Shown in FIG. 3 is a transaction queue or bus miss queue 16 in accordance with one embodiment of the present invention. Bus miss queue 16 comprises miss queue entry number field 80, miss queue entry valid bit 81, bus transaction code field 82, and reload unit entry number field 83. Miss queue entry number field 80 indicates a position within bus miss queue 16. Miss queue entry valid bits 81 indicates whether the miss queue entry is valid. Bus transaction code bits 82 are used to indicate the type of transaction and associated attributes for the associated transaction on system bus 30. Reload unit entry number 83 corresponds to the position within reload unit 12, where the position in reload unit 12 is indicated by entry number bits 69 of FIG. 2. In this manner, each entry in bus miss queue 16 points to an entry in reload unit 12. In one embodiment, bus transaction code 82 is a five bit identifier. Alternate embodiments may incorporate any number of bits, or an alternate identification scheme.

FIG. 4 depicts an exemplary eight entry reload unit 12. In the depicted embodiment, reload unit entry number 3 within reload unit 12 has a valid entry (i.e. the ENTRY VALID bit field 70 is 1), it is designated as a store (ie. the STORE bit field 71 is 1), but it did not hit to a shared cache line (i.e. the HIT SHARED bit field 72 is 0). Thus, entry 3 indicates a store transaction issued by processor 10 that missed (or hit to an invalid line) in data cache 18. (If the store operation hit a cache line that was neither invalid nor shared, the operation would simply complete in data cache 18 without using reload unit 12). Before the store can complete, the cache line corresponding to the store operation is fetched from memory (or from a lower level cache memory). The store operation data is then merged with the fetched data in reload unit 12 to construct an updated cache line. This updated cache line is then reloaded into data cache 18. Because entry 3 in FIG. 4 requires external data (i.e. data provided from system memory via system bus 30 or from a lower level cache), the data status indicator bit 75 is set in reload unit 12. The present invention contemplates a method and mechanism by which data status indicator bit 75 may be changed due to subsequent activity of processor 10. If, for example, processor 10 issues subsequent store operations that ultimately affect the entire cache line associated with entry 3 in FIG. 4, all bytes of entry 3 would be valid and the need to retrieve data via system bus 30 would be eliminated. By providing a mechanism to cancel the pending data fetch transaction, the present invention conserves valuable system bus bandwidth.

Turning to a second example, reload unit entry number 5 has a valid entry (i.e., the ENTRY VALID bit field 70 is 1), it is a store (STORE bit field 71 is a 1), and it hit to a shared cache line as indicated by the 1 in the HIT SHARED bit field 72. To maintain data coherency between various cache memories in a distributed memory multi-processor system when a hit to a shared cache line occurs, processor 10 must inform all other resources that their copies of the cache line associated with entry 5 of reload unit 12 are no longer valid. In one embodiment, processor 10 accomplishes this task by issuing a KILL transaction. Those skilled in the art will appreciate that a KILL transaction as contemplated herein and described previously is an address only transaction that invalidates all other cached copies of a particular cache line. Accordingly, data status bit 75 of entry 5 is set to 0. The present invention contemplates a method and mechanism by which data status bit 75 may be dynamically altered in response to subsequent bus activity. If, for example, a bus master other than processor 10 issues a store operation to the memory address associated with entry 5 of reload unit 12 while the KILL transaction just discussed is still pending in bus miss queue 16. Snoop control 14 would detect the address asserted by the alternate bus master on system bus 30 and, in response, reload unit 12 would change data status indicator bit 75 of entry 5 to force a fetch of the data prior to reloading data cache 18 and completing the store operation. The present invention thus takes advantage of the complementary nature between two commonly encountered scenarios in cache memory system in which pending transactions that require data, such as RWITM transactions, are effectively rendered unnecessary by subsequent cache activity and pending transactions that require no data, such as KILL transactions, are rendered invalid by subsequent cache activity by providing a single bit indicator that distinguishes between the two types of pending transactions and can initiate a modification of a pending transaction from one of the transaction types to the other.

Shown in FIG. 5 is an example of entries in bus miss queue 16. Bus miss queue entry number 0 has a valid entry (i.e. the value is set to 1), and a bus transaction code designated as read with intent to modify (RWITM). For purposes of this disclosure, a RWITM transaction refers to a multiple cycle transaction, typically encountered in updating a cache line in response to a store miss event, in which data is fetched from memory and a portion of the fetched data overwritten. This miss queue entry is linked to reload unit entry number 3 in FIG. 4 which has a data status indicator indicating that it needs data Similarly, bus miss queue entry number 1 has a valid miss queue entry (i.e. the value is set to 1), and a bus transaction type designated as a KILL. This miss queue entry is linked to reload unit entry number 5, in FIG. 4, which has a data status indicator indicating that it does not need data.

Figure 6:
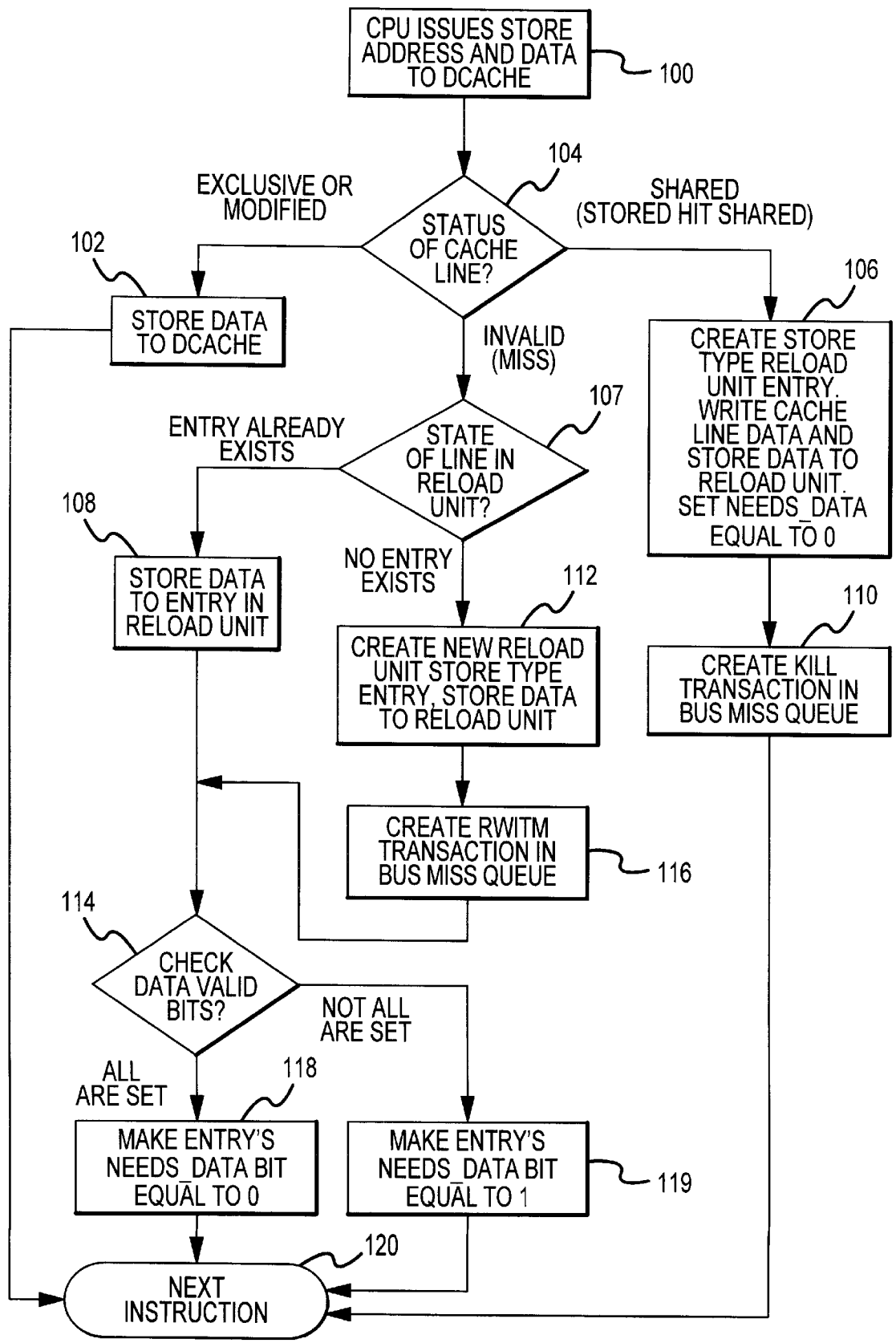
FIGS. 6–9 illustrate, in flow diagram form, a method of controlling a cache according to one embodiment of the present invention.

FIG. 6 illustrates a store instruction flow diagram in accordance with one embodiment of the present invention. In step 100, CPU 20 issues a store operation including address and data signals to data cache 18. In step 104, data cache 18 determines the status of the cache line corresponding to the store operation's address received from CPU 20. If the store operation hits to a shared cache line, then a reload unit entry is created within reload unit 12 at step 106, store data is merged with the cache data and written to the reload entry, and the data status indicator 17 (which is coupled to data status indicator bit 75) for that entry is cleared to indicate that reload unit 12 requires no data from system bus 30. Reload unit 12 then issues a transaction (XN) signal to create a kill bus transaction (KILL) entry within bus miss queue 16, where KILL is a system bus transaction code requiring no data retrieval via system bus 30. After the KILL transaction is created in step 110, the instruction flow proceeds to step 120, where CPU 20 goes to the next instruction.

If in step 104 the store operation address hits to an invalid line in cache memory 18 or misses entirely, then reload unit 12 is scanned in step 107 to determine if an entry corresponding to the operation's address has been previously allocated (i.e., the store operation address hits to an entry in reload unit 12). If the store operation hits to a valid entry within reload unit 12, the store operation's data is merged with the data in the existing entry in step 108. The merging into a single reload unit entry of multiple store transactions with addresses that map to a common cache line beneficially reduces cache pipeline stalls by reducing the number of reload cycles. Thus, if two or more store operations miss to the same cache line and the second and subsequent misses occur before the bus transaction generated by the first miss has been completed, the data for the store operations can be written into a single reload unit entry thus conserving valuable reload unit entries. When the data fetch transaction, such as an RWITM transaction, initiated by the first store miss operation returns the requested data via system bus 30, the fetched data is combined with the store operation data in the reload unit entry such that, after the combining, the reload unit entry includes the data from the multiple store miss operations in the appropriate portions or bytes of the reload unit's data buffer 73 and portions or bytes of the fetched data in the corresponding portions or bytes of data buffer 73 that were unaffected by the multiple store miss operations. After the combining of the fetched data and the store operation data, cache memory 18 may be suitably reloaded from the reload unit data buffer 73. Data valid bits 74 are updated after each store operation and are used to indicate portions of the reload unit's data buffer 73 that were written by the store operation or operations. Typically, a cache line comprises significantly more bytes than the data portion of a single store operation. In one embodiment, for example, each cache line of data cache 18 is 32 bytes in length. In contrast, a single store operation in a 32 bit data bus machine writes only 4 bytes. In this embodiment, the data valid bit 74 field would suitably include 32 bits representing one bit for each byte of the cache line and the single store operation mentioned would set 4 of the 32 bits to indicate which four bytes were written during the store operation. The data valid bits 74 for a reload table entry are checked in step 114 after each store operation. If all of the data valid bits are set indicating the entire data buffer 73 contains valid data, the data status indicator 17 coupled to data status indicator bit 75 for that reload table entry is set to 0 in step 118. When this occurs, a RWITM is no longer required since each byte of the reload table entry is valid and the pending transaction within bus miss queue 16 may be beneficially changed to a KILL transaction requiring no data. In addition, the data buffer 73 may be reloaded into cache memory 18. If, however, all of the data valid bits 74 are not set, the data status indicator 17 for that entry within reload unit 12 is set to 1 in step 119 before proceeding to the next instruction in step 120.

If in step 107, it is determined that the store operation's address misses in both cache memory 18 and reload unit 12, then reload unit 12 allocates a new reload entry and writes the store operation's data to the newly allocated reload entry in step 112. Reload unit 12 then initiates a transaction via transaction (XN) signal to queue a read with intent to modify (RWITM) bus transaction entry within bus miss queue 16, where RWITM is a system bus transaction code requiring data retrieval via system bus 30 or from a lower level cache memory. The instruction flow then proceeds to step 114 where the data valid bits 74 for the new reload unit entry are checked as previously described. Finally, if in step 104, the status of the cache line is determined to be exclusive or modified, then the store data is written directly to the data cache without disturbing reload unit 12.

Figure 7:
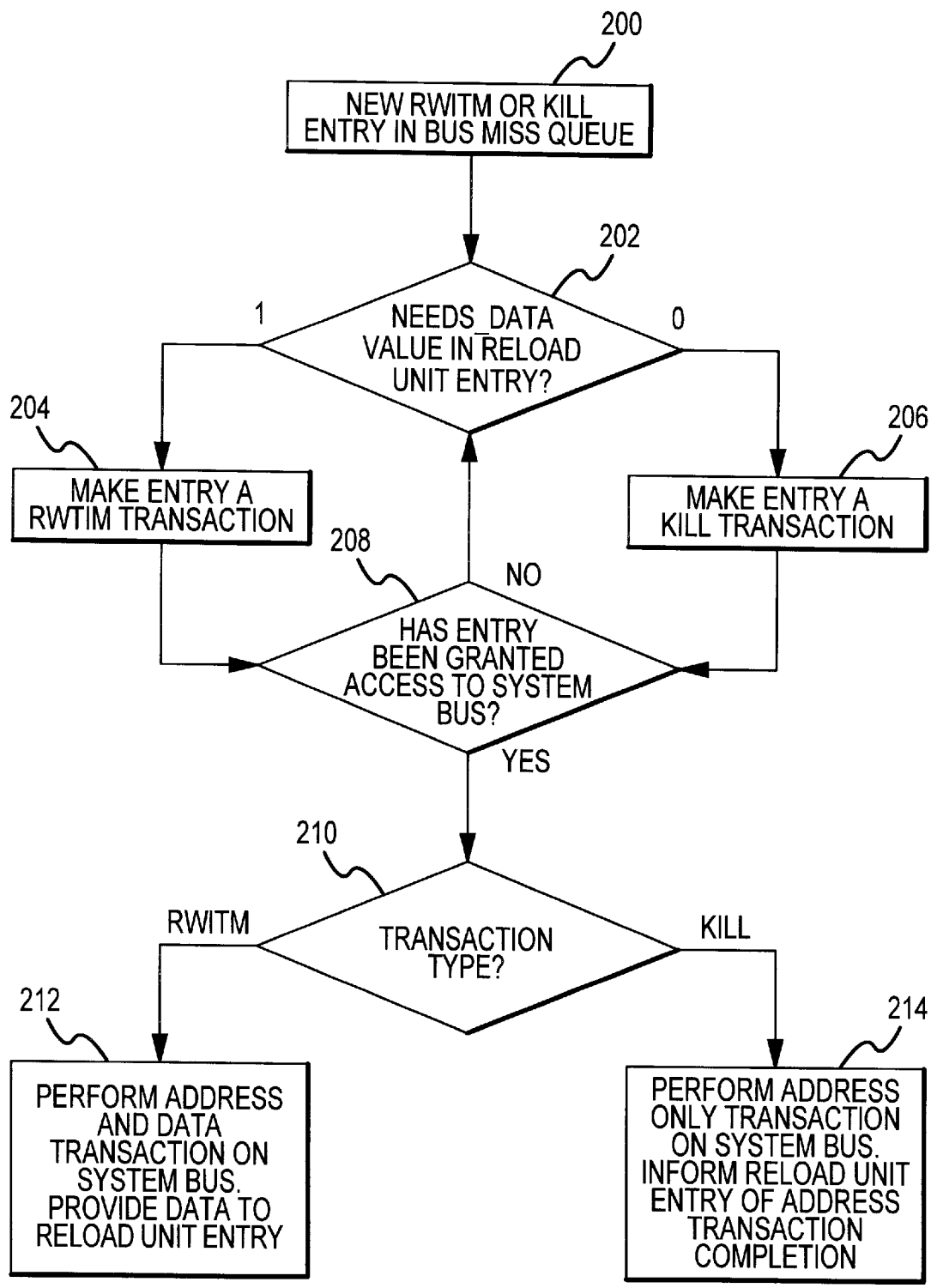

Shown in FIG. 7 is a bus miss queue operation flow in accordance with one embodiment of the present invention. In step 200, a new RWITM or KILL bus transaction entry is entered into bus miss queue 16. Bus miss queue 16 then checks, in step 202, the data status indicator 17 from the corresponding entry of reload unit 12 (as indicated by reload entry unit number 83) to determine whether data is required to complete the operation associated with the reload unit entry. If reload unit 12 does not need a data value (i.e. data status indicator 17 is 0), then the transaction code for the entry in bus miss queue 16 is changed to KILL in step 206.

After that, processor 10 using a bus protocol checks to see if the transaction has been granted access to system bus 30 in step 208. If the transaction has been granted access to system bus 30, then in step 210 the processor determines the transaction type issued by bus miss queue 16 and the instruction flow proceeds to step 214 because the transaction type is a KILL transaction. In step 214, an address only transaction is performed on system bus 30 and reload unit 12 is informed that the address transaction has been completed. However, if in step 208 the KILL bus transaction entry has not been granted access to the system bus 30, then the operation flow proceeds back to step 202.

Similarly, if in step 202 reload unit 12 needs any data from system bus 30(ie. the data status indicator signal is set at 1), then the transaction for the entry in bus miss queue 16 is changed to RWITM in step 204. After that, processor 10 using a bus protocol checks to see if the RWITM bus transaction entry has been granted access to system bus 30 in step 208. If the RWITM bus transaction entry has been granted access to system bus 30, then in step 210 the processor determines the transaction type issued by bus miss queue 16 and the instruction flow proceeds to step 212 because the transaction type is a RWITM transaction. In step 212, an address transaction and a data transaction are performed on system bus 30 and data is provided to reload unit 12. However, if in step 208 the RWITM bus transaction entry has not been granted access to the system bus 30, then the operation flow proceeds back to step 202

Figure 8:
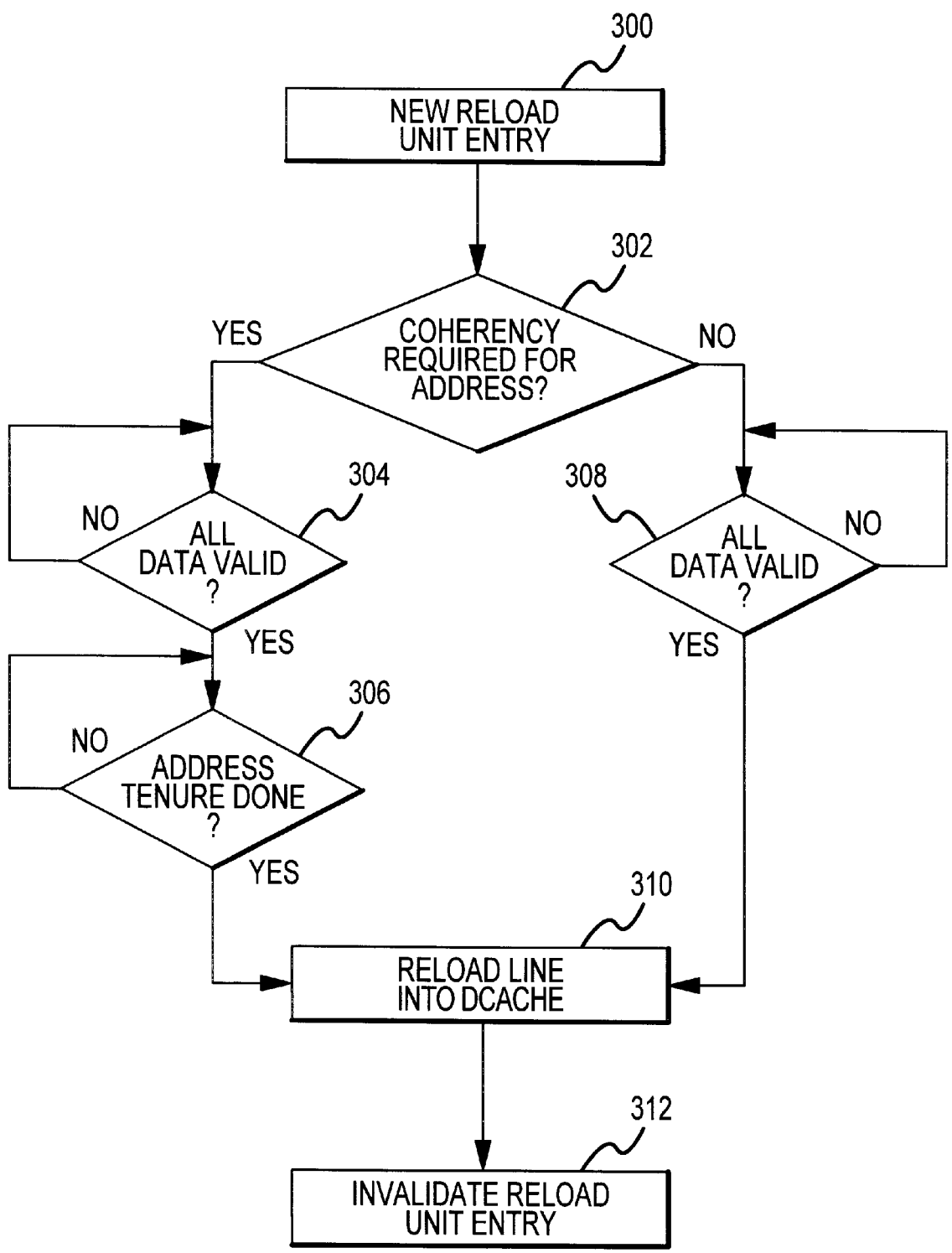

Shown in FIG. 8 is a reload unit entry operation flow in accordance with one embodiment of the present invention. In step 300, reload unit 12 receives a new reload unit entry. Processor 10 then determines whether or not the address corresponding to the new reload unit entry requires coherency enforcement in step 302. If the address does not require coherency enforcement, then in step 308 the data for the new reload unit entry is checked to see if all of the data is valid. If all of the data is valid, reload unit 12 reloads the cache line into data cache 18 in step 310. After that, the reload unit entry within reload unit 12 is invalidated in step 312. However, if all of the data is not found to be valid in step 308, the operation flow loops back to the beginning of step 308.

However, if in step 302 coherency is required for the address, then in step 304 the data for the new reload unit entry is checked to see if all of the data is valid. If all of the data is valid, then the new reload unit entry is checked to see if the address tenure is completed in step 306. However, if all of the data is not found to be valid in step 304, the operation flow loops back to the beginning of step 304.

In step 306 if the address tenure for the new reload unit entry is completed reload unit 12 reloads the cache line into data cache 18 in step 310. After that, the reload unit entry within reload unit 12 is invalidated in step 312. However, if the address tenure for the new reload unit entry is not completed, the operation flow loops back to the beginning of step 306.

Figure 9:
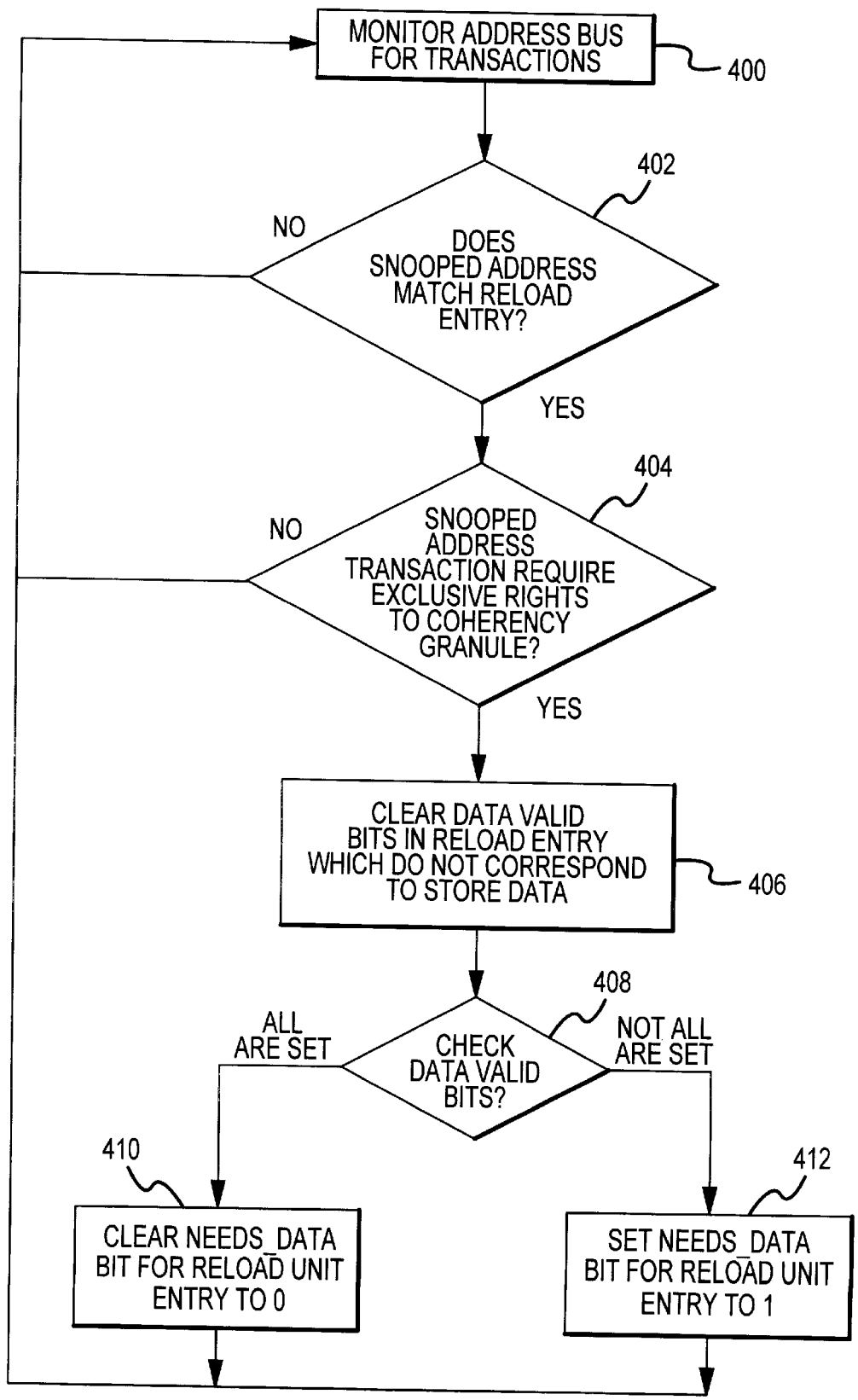

Shown in FIG. 9 is a snoop controller operation flow in accordance with one embodiment of the present invention. In step 400, snoop control 14 monitors system bus 30 for transactions. Snoop control 14 then determines in step 402 whether or not the snooped transaction has an address that matches a reload unit entry address within reload unit 12. If the snooped address does not match the address of a reload unit entry within reload unit 12, the operation flow returns to step 400 to monitor system bus 30 for further transactions. However, if in step 402 the snooped address does match the address of a reload unit entry within reload entry 12, then snoop control 14 determines whether or not the snooped transaction requires exclusive rights to a coherency granule in step 404. If the snooped transaction does not require exclusive rights to a coherency granule, the operation flow returns to step 400 to monitor system bus 30 for further transactions. However, if in step 404 the snooped transaction does require exclusive rights to a coherency granule, then in step 406 snoop control 14 sends reload unit 12 a snoop signal and reload unit 12 clears the data valid bits for that portion of the data within the reload unit entry that do not correspond to store data. After that, the data valid bits for the reload unit entry are checked in step 408. If not all of the data valid bits are set, then the data status indicator for reload unit 12 is set to 1 in step 412. After that the operation flow returns to step 400 to monitor system bus 30 for further transactions. However, if all the data valid bits are set, then the data status indicator for reload unit 12 is set to 0 in step 410. After that the operation flow returns to step 400 to monitor system bus 30 for further transactions.

Figure 10:
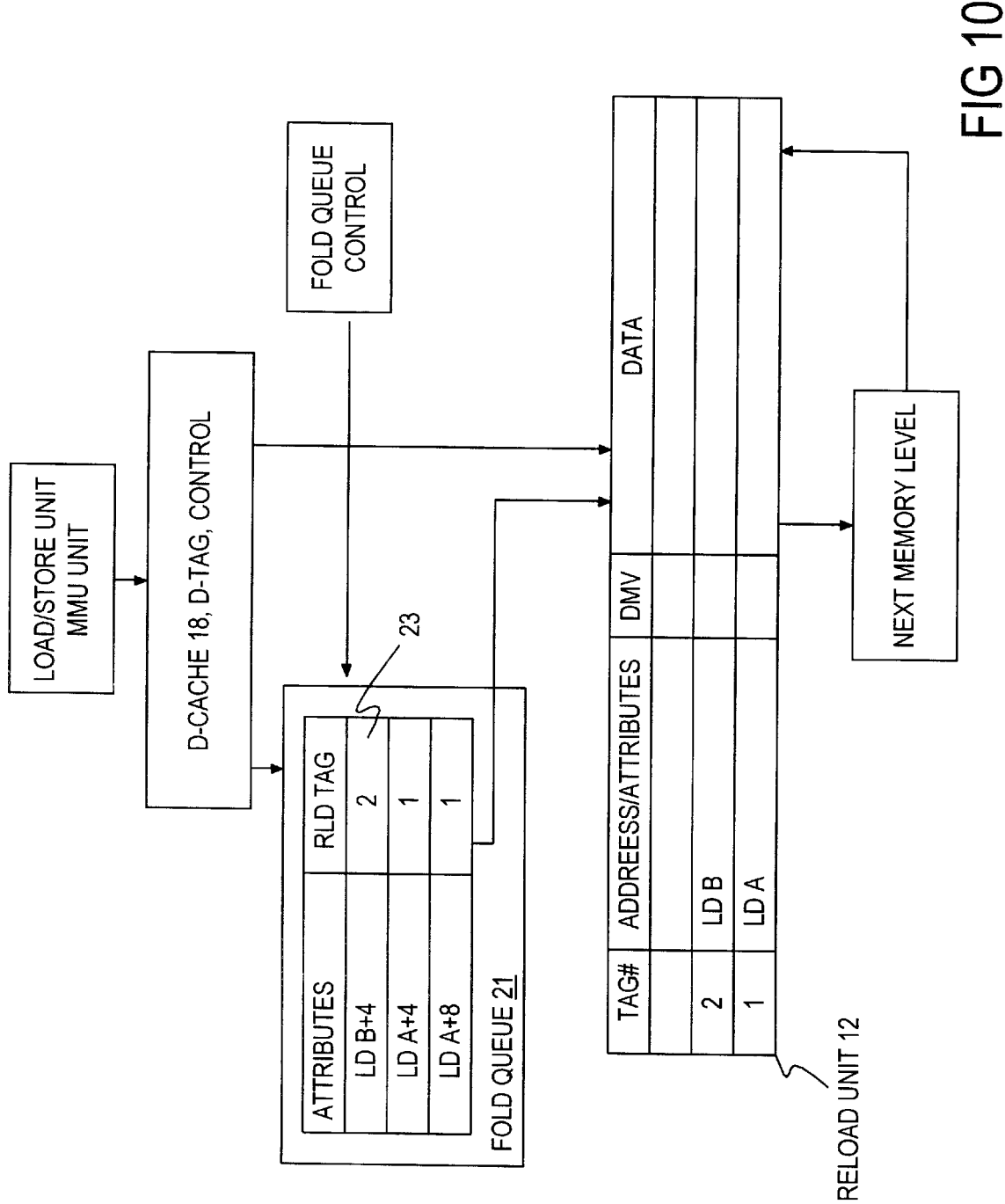
FIG. 10 is a simplified block diagram of an embodiment of the present invention suitable for handling multiple load operations that miss in the cache memory.

Turning now to FIG. 10, one embodiment of the present invention contemplates a reload unit 12 which operates in conjunction with an operation queue identified in this disclosure as fold queue 21 to facilitate handling of multiple proximal load transactions that miss to a common cache line. Reload unit 12, as described previously includes a plurality of entries suitable for storing data, address, and attribute information of load/store operations that miss in data cache 18. Fold queue 21 includes a plurality of entries wherein each entry includes a pointer or tag 23 that points to an associated entry within reload unit 12. In one embodiment, when a CPU load operation address misses in data cache 18 and in reload unit 12, an entry is allocated in reload unit 12 and a line fetch is queued up in bus miss queue 16 (FIG. 1). If, before the line fetch is executed, a subsequent CPU load operation misses in data cache 18 but hits to an entry in reload unit 12, an entry is created in fold queue 21. Thus, the fold queue mechanism beneficially reduces cache pipeline stalls that would otherwise result when two load operations miss to a common cache line. The fold queue entry tag 23 points to the reload table entry with which the fold queue entry shares a common cache line mapping. If a second subsequent load misses in cache memory 18 but hits to the reload unit entry before the system bus transaction (ie., the line fetch) initiated by the first load operation completes, a second entry in the fold queue is created. If the second subsequent load misses in both cache memory 18 and reload unit 12, a second entry is allocated in reload unit 12. It will be appreciated that, because the fold queue entries simply point to entries in reload unit 12, the fold queue entries require no data buffer and are thus relatively inexpensive to implement and beneficially reduce consumption of reload unit entries, which require full data fields. When the data fetch initiated by the first load completes, the fetched data is stored in the appropriate entry of reload unit 12 and the first load operation is completed to the CPU. The entries in fold queue 21 are then checked to determine if any of the pending fold queue entries point to the reload unit entry under consideration. If the tag field 23 of any of the fold queue entries points to the reload unit entry, then the fold queue entries are satisfied from the reload unit's data buffer. In this manner, multiple CPU loads can be completed without tying up the cache-CPU bus. After all fold queue entries have been completed, the data in the reload unit data buffer is reloaded into cache 18 and the reload unit and fold queue entries are invalidated. In one embodiment, the reloading of cache 18 and the completion of the subsequent load operations from the reload unit occur concurrently. In the preferred embodiment, the reloading of cache memory 18 from reload unit 12 can proceed while the CPU load/store unit is issuing additional operations to cache memory 18. By providing a relatively simple hardware mechanism for temporarily handling multiple load misses to a single cache line while awaiting a fetch of data, this embodiment of the present invention improves overall performance by reducing latencies associated with conventional memory systems in which the first subsequent load operation would cause a cache pipeline stall awaiting the completion of the data fetch initiated by the first load miss.

Although the invention has been described and illustrated with reference to specific embodiments, it is not intended that the invention be limited to those illustrative embodiments. Those skilled in the art will recognize that modifications and variations may be made without departing from the spirit and scope of the invention. Therefore, it is intended that this invention encompasses all the variations and modifications as fall within the scope of the appended claims.

What is claimed is:

1. A cache system comprising:
   a cache memory coupled to a load/store unit of a central processing unit;
   a buffer unit coupled to the cache memory, the buffer unit comprised of a plurality of buffer unit entries suitable for temporarily storing operations generated by the central processing unit, wherein each buffer unit entry includes a single-bit transaction type field indicative of whether the corresponding transaction requires data via said system bus;
   a bus transaction queue coupled to the buffer unit, wherein the bus transaction queue includes a plurality of entries wherein each bus transaction queue entry includes a pointer to one of the plurality of buffer unit entries; and
   wherein the buffer unit, in response to a first operation initiated by the load/store unit, is configured to buffer the first operation in a corresponding entry of the buffer unit and queue a first transaction in a first entry of the bus transaction queue, wherein said bus transaction queue is further configured to modify the first transaction from a first transaction type to a second transaction type prior to execution in response to an event occurring after the queuing of the first transaction.

2. The system of claim 1, wherein the first transaction type requires data via a system bus to which the cache system is connected and wherein the second transaction type requires no data.

3. The system of claim 1, wherein the first operation comprises a store operation that misses in the cache memory.

4. The system of claim 3, wherein the first transaction is a read with intent to modify transaction.

5. The system of claim 3, wherein the event comprises at least one subsequent store operations that miss in the cache memory, wherein the first and subsequent store operations map to a common cache line.

6. The system of claim 1, wherein the first transaction type requires no data via a system bus to which the cache system is connected and wherein the second transaction type requires data.

7. The system of claim 1, wherein the first operation comprises a store operation that hits in the cache memory to a shared cache line.

8. The system of claim 7, wherein the first transaction is a KILL transaction.

9. The system of claim 7, where the event comprises a snooped transaction on the system bus detected by a snoop control unit coupled between said buffer unit and said system bus, and wherein the address of the snooped transaction maps to the shared cache line.

10. A method of handling operations in a cache system, comprising:
    in response to a central processing unit issuing a first operation that is unable to complete in a cache memory, storing the first operation in a corresponding entry of a buffer unit and queuing a first transaction in a first entry of a bus transaction queue;
    modifying a first transaction type of said first transaction in response to an event occurring prior to execution of the first transaction, wherein the first transaction type is indicative of whether the transaction requires data;
    in response to the central processing unit issuing a second operation that is unable to complete in the cache memory, storing the second operation in a corresponding entry of the buffer unit and queuing a second transaction in a second entry of the bus transaction queue, wherein the second transaction is of a second transaction type; and
    modifying the transaction type of said second transaction from the second transaction type to the first transaction type in response to an event occurring prior to execution of the second transaction, wherein one and only one of said first and second transaction types requires data.

11. The method of claim 10, wherein said first transaction type requires data prior to the modification and requires no data after the modification.

12. The method of claim 10, said first operation comprises a store operation that misses in the cache memory.

13. The method of claim 12, wherein the event responsible for the modification of the transaction type comprises at least one subsequent store operation, wherein the first and subsequent store operations map to a common cache line.

14. The method of claim 13, wherein the first and subsequent store operations are merged into a common buffer unit entry and further wherein the first and subsequent store operations affect each byte of the buffer unit entry's data buffer.

15. The method of claim 10, wherein the first transaction type is a read with intent to modify (RWITM) prior to the modification and a KILL transaction after the modification.

16. The method of claim 10, wherein the first transaction type requires no data prior to the modification and requires data after the modification.

17. The method of claim 10, wherein the first transaction comprises a KILL transaction prior to the modification and comprises a RWITM transaction after the modification.

18. The method of claim 10, wherein the first operation comprises a store operation that hits to a shared cache line in the cache memory.

19. The method of claim 10, wherein the event comprises a snooped transaction appearing on the system bus, wherein the address of the snooped transaction matches to the shared cache line.

20. A computer system, comprising;
    a central processing unit including a load/store unit;
    a cache memory coupled to said load/store unit;
    a buffer unit coupled to the cache memory, the buffer unit comprised of a plurality of buffer unit entries suitable for temporarily storing operations generated by the central processing unit that are temporarily unable to complete in the cache memory, each buffer unit entry includes a single-bit transaction type field indicative of whether the corresponding transaction requires data via said system bus;
    a bus transaction queue coupled to the buffer unit, wherein the bus transaction queue includes a plurality of entries wherein each bus transaction queue entry includes a pointer to one of the plurality of buffer unit entries; and
    wherein the buffer unit, in response to a first operation initiated by the load/store unit that is unable to complete in the cache memory, is configured to buffer the first operation in a corresponding entry of the buffer unit and queue a first transaction in a first entry of the bus transaction queue, and further wherein said buffer unit is further configured to modify the first transaction from a first transaction type to a second transaction type prior to execution in response to an event occurring after the queuing of the first transaction, wherein the transaction type is indicative of whether the transaction requires data and wherein one and only one of said first and second transaction types requires data.

* * * * *